July 31, 1934.  V. G. APPLE  1,968,587
VEHICLE BRAKE
Filed Nov. 2, 1929  3 Sheets-Sheet 3
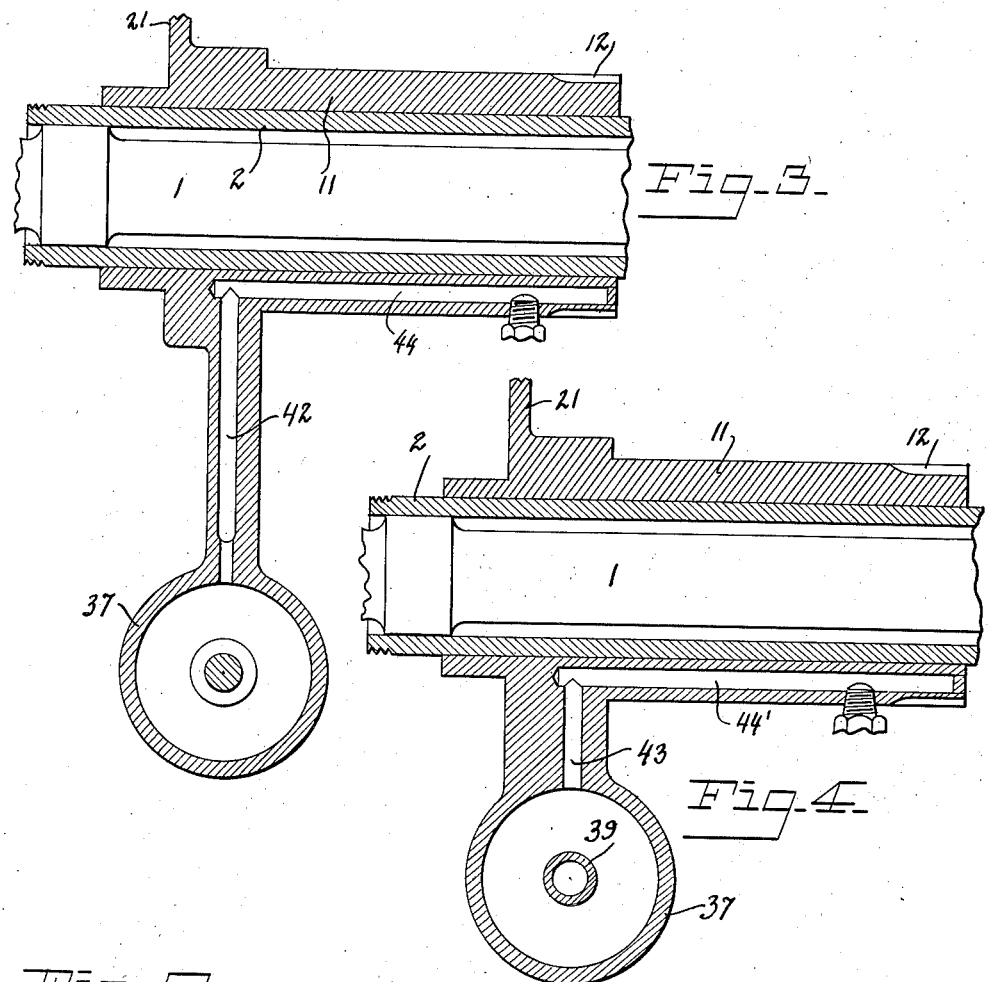
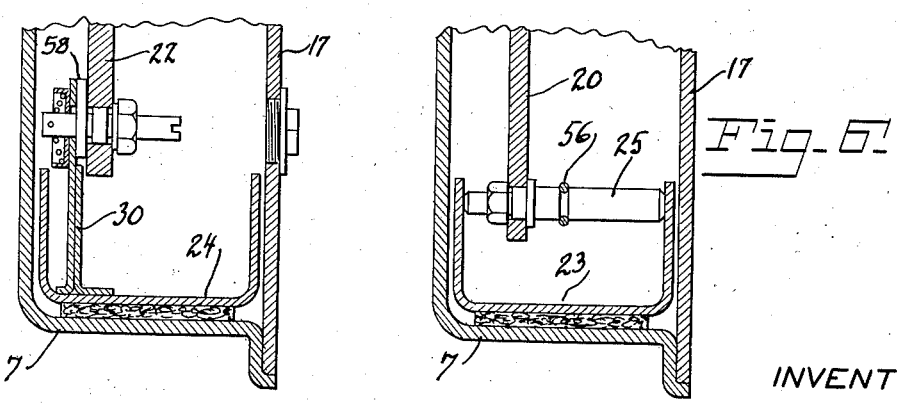
INVENTOR.
Vincent G. Apple
BY Burton & McConkey
ATTORNEYS Patented July 31, 1934

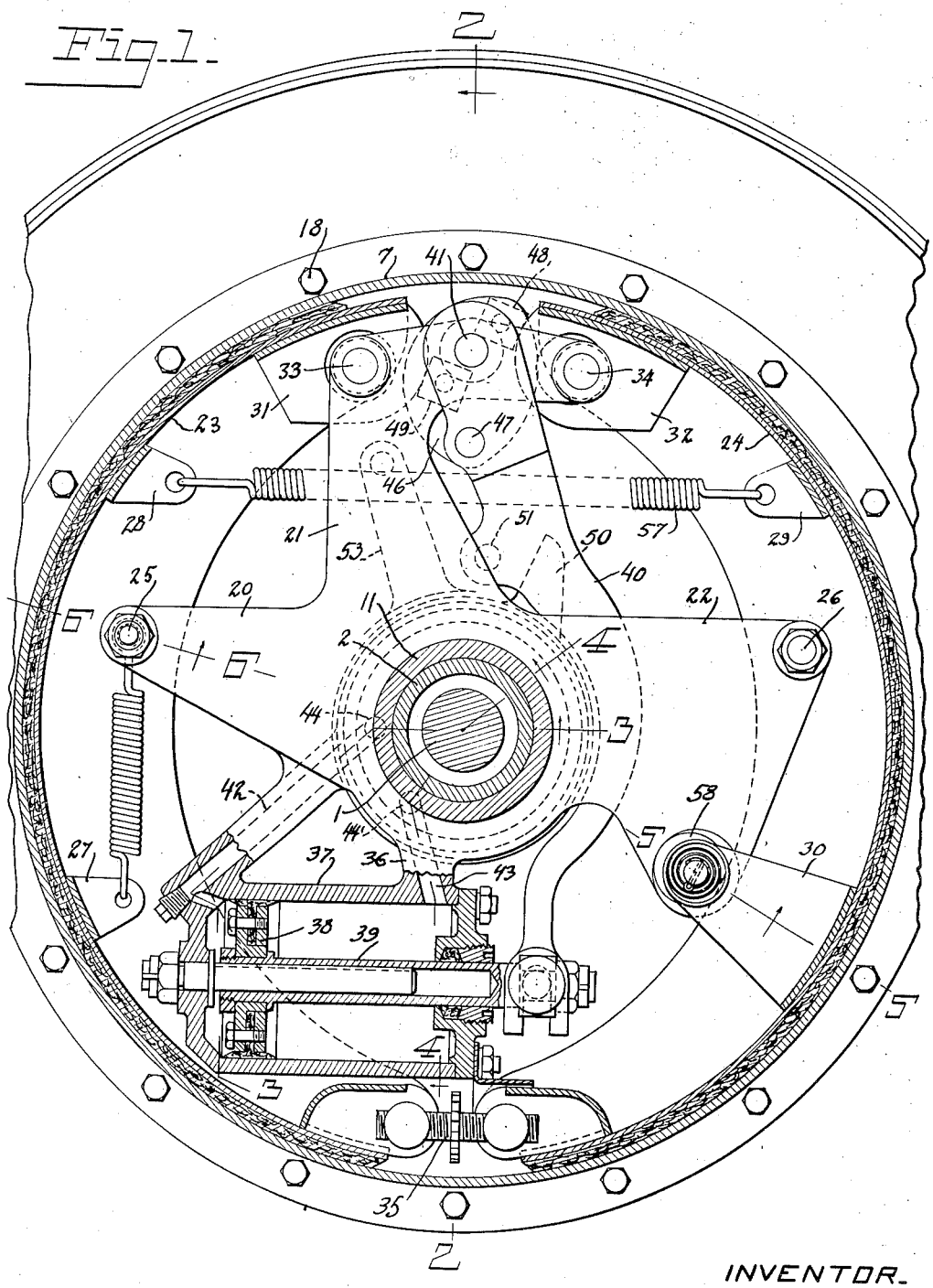

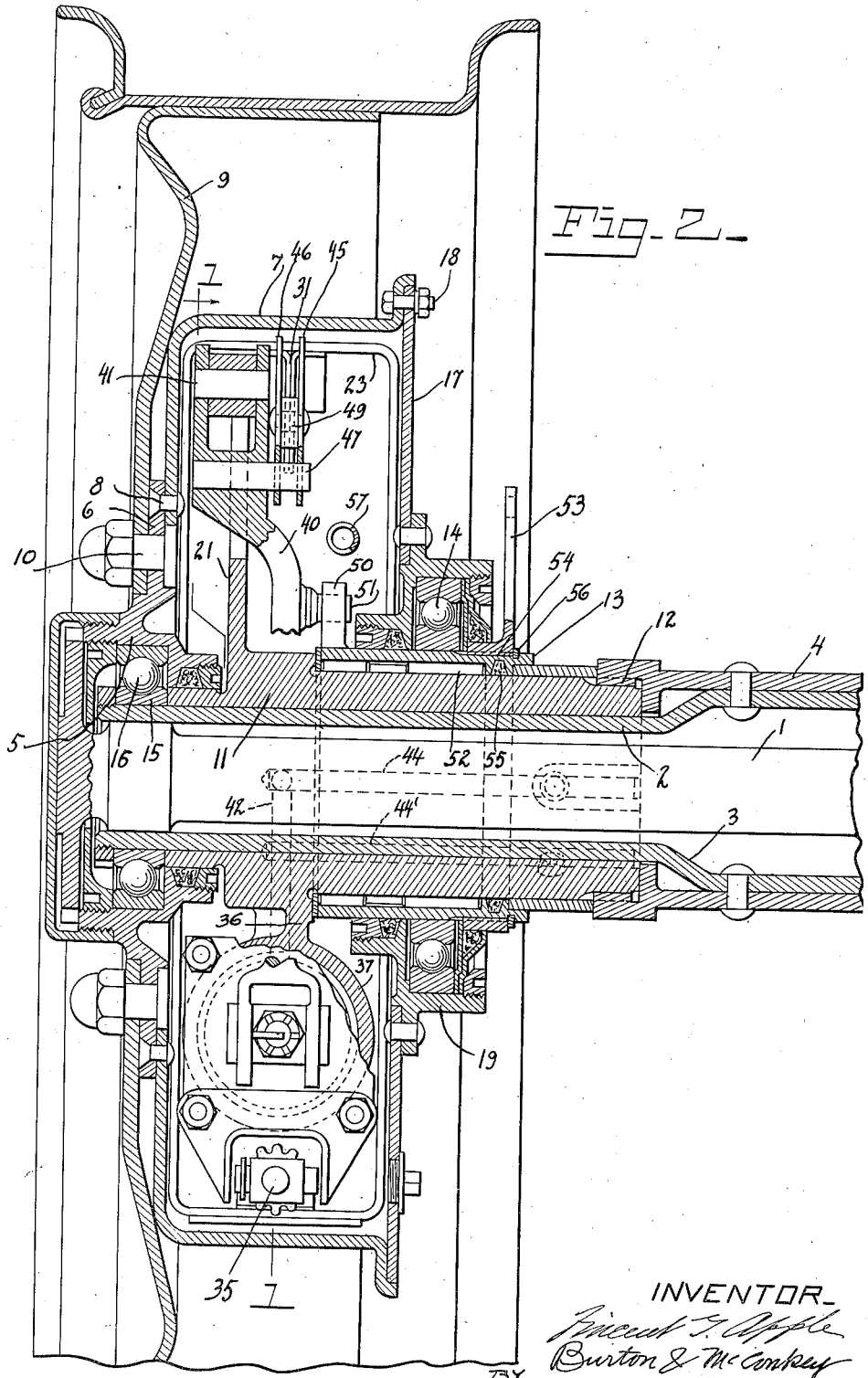

1,968,587

UNITED STATES PATENT OFFICE 1,968,587

VEHICLE BRAKE

Vincent G. Apple, Dayton, Ohio, assignor to Bendix Brake Company, South Bend, Ind., a corporation of Illinois Application November 2, 1929, Serial No. 404,237

15 Claims. (Cl. 188—106)

My invention relates to improvements in brakes and has particular reference to those adapted for use on automotive vehicles.

The object of my invention is to enable the operator of the automobile to exert far greater than the usual brake applying force by the customary pressure exerted on the automobile brake foot pedal.

In accomplishing this purpose a further object of my invention is to provide a unitary fluid pressure power brake assembly which is completely encased by a rotating brake drum, thus avoiding the damage which may be done by dirt and water which find their way into the operating parts.

A still further object of my invention is to utilize a fluid pressure power device for the purpose of expanding the ordinary type of internal expanding brake shoe and to so arrange the means for expanding them and the power applying means that the greatest force may be exerted in the expanding operation with the minimum of power effort.

A still further object of my invention is to provide manual means for expanding these brake shoes independently of, or in conjunction with, the power expansion means and thus provide a safety feature which may be utilized in the event that the power brake mechanism should fail.

Further meritorious features and objects of my invention will appear from the following description taken in conjunction with the drawings wherein like numerals refer to like parts throughout the several figures wherein:

Fig. 1 is a transverse section taken on line 1—1 of Fig. 2 through an automotive rear wheel and axle of the full floating type in which my improved brake mechanism is embodied.

Fig. 2 is a vertical axle section taken on line 2—2 of Fig. 1.

Fig. 3 is a fragmentary section taken on the line 3—3 of Fig. 1.

Fig. 4 is a fragmentary section taken on the line 4—4 of Fig. 1.

Fig. 5 is a fragmentary section taken on the line 5—5 of Fig. 1 and

Fig. 6 is a fragmentary section taken on the line 6—6 of Fig. 1.

The rotating rear axle 1 is mounted in the tubular spindle 2 which is swaged as at 3 and strengthened by a reinforcing member 4 which is riveted thereto. Keyed to the outer end of the axle 1 is the hub 5 which is provided with a flange 6 extending radially of said hub. The brake drum 7 is riveted to this flange at 8 and the wheel member 9 is bolted to both the flange and the drum by means of the bolt 10.

A hub or sleeve member 11 is secured against rotation on the tubular spindle 2 by means of a plurality of keys on its inner end which intersect with similar keys on the reinforcing member 4 as at 12. A sleeve member 13 is revolvable about the hub 12 and the inner race of the bearing member 14 is mounted thereon. On the outer end of the hub member 11 a corresponding outer race 15 with its corresponding ball bearing 16 is mounted.

The inner open face of the brake drum 7 is provided with the centrally apertured closure member 17 which is bolted thereto by means of the bolts 18. An inner housing 19 is riveted to the closure member and the entire assembly is rotatably journaled about the tubular spindle 3 through the outer hub member 5 and the housing 19 which bear respectively on the bearings 16 and 14. The hub member 11 is provided with radially extending arms 20, 21 and 22. Radially expansible brake shoes 23 and 24 are secured to the arms 20 and 22 by means of the studs 25 and 26. These studs function to retain the side flanges of the channel shaped brake shoes properly spaced from one another and prevent them from contacting with the sides of the closed brake drum assembly, as shown in Fig. 6. To the inner periphery of brake shoe 23 are welded the flanges 27 and 28 and to the inner periphery of brake shoe 24 are welded the flanges 29 and 30. Spring 56 connects flange 27 with stud 25 and the spring 57 extending between flanges 28 and 29 functions to retain the shoes 23 and 24 in their "off" or non-friction bearing position.

Two brackets 31 and 32 having elongated apertures therein are welded to adjacent extremities of the two brake shoes and a pair of studs 33 and 34 fastened to the arm 21 of hub 11 extend through these apertures, thereby limiting the expanding and retracting movement of the shoes. The other extremities of the brake shoes are connected by means of the customary right and left adjustment screw 35 which functions to properly space the brake shoe linings from the inner periphery of the brake drum and to compensate for occasional wear on the brake lining.

A flange 36 depends from the hub member 11 and serves to support the fluid pressure cylinder 37 which, along with its piston 38 and piston rod 39, constitutes the power means for applying the brakes. Conduits 44 and 44′ extend longitudinally inside the hub member 11 and are provided with apertures which connect with other conduits 42 and 43 which in turn open into the cylinder member 37 and constitute means for transmitting the fluid to and from the cylinder. Fluid supply is controlled from some convenient point outside the drum by the vehicle operator.

A brake operating arm 40 is pivoted on stud 41 which is fixed in the arm 21 of hub member 11. The other end of this brake applying arm is attached to the fluid pressure piston rod 39. The two plates 45 and 46 are pivoted to the brake arm by means of the stud 47 and to these plates are pivoted the cam blocks 48 and 49. The brake shoes are shown in their "on position," the aperture in the bracket 32 being anchored against the stud member 34. When the fluid is forced through the conduits into the cylinder 37 thereby forcing the piston 38 and piston rod longitudinally through the cylinder the brake arm 40 is forced to rotate about its pivot point 41 and the cam blocks 48 and 49 bear against the brackets 31 and 32 to force them apart and bring the shoes into contact with the rotating brake drum. The "wrap" caused by the rotating drum will cause one of the brackets 31 and 32 to anchor against its respective stud, depending upon the direction of rotation.

The brake drum and brake shoe structure described herein is substantially identical to that described in my co-pending patent application No. 404,235 filed November 2, 1929 and in addition I have provided means on the brake arm 40 and the sleeve 13 whereby the brakes may be manually applied independently of the power application through the fluid pressure device. On the inner end of the sleeve 13 I have provided a short funnel 50 which is adapted to contact with a stud 51 projecting laterally from the brake arm 40. On the other end of the rotatable sleeve 13, outside the drum enclosure, there is another radially extending arm 53, secured against rotation on sleeve 13 by multiple key 54 and against axial movement by split snap ring 56, and adapted to be manually operated by some sort of mechanical linkage to apply the brakes through the operating arm 40 entirely independently of the power actuating mechanism. The rollers 52 lower the resistance to rotation of the sleeve member 13 when actuated by the arm 53 and an oil seal ring 55 prevents escape of the lubricant.

Fig. 5 discloses the conventional eccentric adjustment for the shoes whereby the proper spacing is maintained between the bands and the inner surface of the brake drum. The rotatable cam member 58 is mounted on the arm 22 of the hub member 11 and contacts with inner end of the flange 30 which, as aforesaid, is secured to the inner periphery of the brake shoe 24.

The present invention contemplates the use of one set of shoes for all purposes and should preferably be employed in a hookup where there is manual linkage from a brake pedal to the brakes, and where there is a valve so connected in the manual linkage that increased manual brake applying effort would increase the valve opening to provide greater vacuum effect.

Various modifications of my invention will be apparent to those skilled in the art and I, therefore, intend to limit myself only within the scope of the appended claims.

I claim:

1. Brake mechanism comprising, in combination, a rotatable brake drum self enclosed at each end, radially expansible brake shoes secured against rotation within said drum, fluid pressure means for expanding said shoes supported within the drum and means operable independently of said fluid pressure means from a point outside the drum for expanding the shoes.

2. Braking mechanism comprising, in combination, a rotatable brake drum self enclosed at each end, radially expansible brake shoes secured against rotation within said drum, fluid pressure means for expanding said shoes supported within the drum, a brake arm adapted to be actuated by said pressure means to expand the shoes, and means extending from within the drum adapted to actuate said brake arm independently of the fluid pressure means.

3. Brake mechanism including in combination, a rotatable brake drum, internal expanding nonrotatable friction means supported within said drum, a camming arm fulcrumed near an outer periphery of the friction means for moving the same into frictional engagement with the drum, fluid pressure means for applying force to said camming arm midway between the axis of that portion of the drum and the periphery farthest removed from the fulcrum of the arm, and means extending from within said drum for manual actuation of said camming arm independently of the pressure means.

4. Brake mechanism including in combination, a rotatable brake drum, a non-rotatable internal friction device of channel shaped cross section supported within said drum, a camming arm fulcrumed adjacent an outer peripheral portion and between the side flanges of said friction device for moving it into braking engagement with the drum, fluid pressure means disposed adjacent an opposite peripheral portion of the friction device and between its side flanges for applying force to said camming arm, and means extending outside said drum for manual actuation of said friction device independently of said pressure means.

5. Brake mechanism comprising a rotatable brake drum having closed ends, a hub member secured against rotation within said drum having radially extending arms, friction means of channel shaped cross section supported within the drum by said arms for movement into braking engagement with the drum, an actuating lever extending substantially diametrically across the drum operatively engaging at one end said friction means, fluid pressure means disposed within the channel of the friction means and operatively engaging the lever near its opposite end, and means manually operable from outside the drum engaging said actuating lever for operating the brakes independently of the pressure means.

6. Braking mechanism comprising a non-rotatable axle, a brake drum closed at both ends rotatably mounted thereon, a hub member secured against rotation within said drum and having radially extending arms, radially expansible friction means and fluid pressure means for expanding the friction means supported by said hub member, a sleeve rotatably mounted on said axle having a radially extending arm at each end, one inside the drum and one outside, and means whereby rotation of said sleeve operates to expand the friction means independently of the fluid pressure means.

7. In combination with a rotatable integral closed brake drum, friction members supported therein, fluid power means supported therein within the plane of the members and operable to actuate the same, and means whereby said members may be actuated manually independently of said power means from outside the drum.

8. Brake mechanism comprising, in combination, an integral closed brake drum, brake friction means within the drum, fluid pressure power means within the drum operable to apply said brake friction means, and manual means operable independently to apply said brake friction means.

9. Braking mechanism comprising, a non-rotatable axle, a hollow drum closed at the ends, a bearing in each end to support said drum for rotation about said axle, brake shoes of channel shaped cross-section between said bearings within said drum, means held against rotation by said axle to support said shoes for radial movement and against rotation about said axle, and fluid pressure operated power means located between the webs of the channel shaped shoes to move said shoes radially.

10. Braking mechanism comprising, a non-rotatable axle, a brake supporting member thereon comprising an integral hub portion, brake supporting arms, a brake shoe operating cylinder, fluid pressure passages into said cylinder and means to secure said member against rotation on the axle, brake shoes operably supported on said arms, a brake operating cam supported on one arm, an operating lever for said cam, a piston in said cylinder, means operatively connecting said piston and arm, and a brake drum closed at both ends, having a bearing at each end for rotation about said axle and surrounding the aforesaid mechanism.

11. Braking mechanism comprising, a non-rotatable axle, a hub secured against rotation on said axle having a web portion extending radially outward from said hub near its middle, brake shoes supported on said web, a cam for operating said shoes supported on said web, a cylinder for operating said cam carried by said web, an anti-friction bearing on said hub on one side of said web, another anti-friction bearing on said axle on the other side of said web, a separate housing for each anti-friction bearing, a flange extending radially outward from each housing, a brake drum secured to the flange of one said housing, a brake drum cover secured to the flange of the other said housing, and bolts secured to the flange of the other said housing, and bolts securing the cover to the drum at their outer edges to enclose the braking mechanism therein.

12. Brake mechanism including, in combination, a rotatable brake drum, a non-rotatable internal expanding friction device of channel shaped cross section supported within said drum, a camming arm fulcrumed adjacent an outer periphery and between the side flanges of said friction device for moving it into braking engagement with the drum, and means disposed adjacent the opposite periphery of the friction device and between the side flanges for applying force to said camming arm.

13. Brake mechanism, including in combination, a rotatable brake drum having closed ends, a stationary hub member having radial extensions within said drum, friction means of channel shaped cross section supported within said drum upon said extensions for movement into braking engagement with the drum, an actuating lever extending substantially diametrically across the drum, operatively engaging at one end said friction means, and power means disposed within the channel of the friction means operatively engaging the lever near its opposite end.

14. In combination with brake mechanism including a pair of expansible friction means having adjacent separable ends, an actuating cam supported between said adjacent ends to separate the same, fluid pressure means supported within the plane of the friction members and coupled with said cam, and independently manual operable means coupled with said cam.

15. Braking mechanism comprising, a non-rotatable axle, internal expanding brake shoes, a cam adapted for part rotation to expand said shoes, a fluid pressure power device having a cylinder closed at both ends, a piston in said cylinder, a lever arm on said cam to give part rotation to said cam, a piston rod extending from the piston through one end of said cylinder, connections from said rod to said arm, an axle member secured to said axle and carrying means to support said shoes said cam and said cylinder against rotation, a bearing on said axle at one end of the axle member, a rotatable brake drum closed at both ends having an end rotatably supported on said axle surrounding the braking mechanism, and fluid pressure passages entering the axle outside the confines of the drum extending lengthwise through the axle to a point within the confines of the drum, thence outwardly into the cylinder.

VINCENT G. APPLE.